(12) United States Patent
Li

(10) Patent No.: US 9,007,488 B2
(45) Date of Patent: Apr. 14, 2015

(54) SYSTEMS AND METHODS FOR GENERATING INTERPOLATED HIGH-DYNAMIC-RANGE IMAGES

(71) Applicant: Semiconductor Components Industries, LLC, Phoenix, AZ (US)

(72) Inventor: Huai Dong Li, Cupertino, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 74 days.

(21) Appl. No.: 13/786,199

(22) Filed: Mar. 5, 2013

(65) Prior Publication Data

US 2013/0242133 A1    Sep. 19, 2013

Related U.S. Application Data

(60) Provisional application No. 61/608,493, filed on Mar. 8, 2012.

(51) Int. Cl.
*H04N 5/235* (2006.01)
*H04N 5/228* (2006.01)
(Continued)

(52) U.S. Cl.
CPC .............. *G06T 5/008* (2013.01); *H04N 5/2353* (2013.01); *H04N 5/2355* (2013.01); *H04N 9/045* (2013.01); *G06T 2200/21* (2013.01); *G06T 2207/10024* (2013.01); *G06T 2207/20208* (2013.01)

(58) Field of Classification Search
CPC ... H04N 5/2353; H04N 5/2355; H04N 5/235; H04N 5/335; H04N 5/35554; H04N 5/2352; H04N 5/35536; G06T 2200/21; G06T 2207/10024; G06T 2207/20208
USPC .................. 348/218.1, 221.1, 222.1, 229.1
See application file for complete search history.

(56) References Cited

U.S. PATENT DOCUMENTS 5,144,442 A    9/1992    Ginosar et al.
5,247,366 A    9/1993    Ginosar et al.
(Continued)

FOREIGN PATENT DOCUMENTS

EP    2375383    12/2011
EP    2515273    10/2012

OTHER PUBLICATIONS

Huai Dong Li et al., U.S. Appl. No. 13/646,453, filed Oct. 5, 2012.
(Continued)

*Primary Examiner* — Twyler Haskins
*Assistant Examiner* — Padma Haliyur
(74) *Attorney, Agent, or Firm* — Treyz Law Group; Michael H. Lyons

(57) ABSTRACT

Electronic devices may have camera modules that include an image sensor and processing circuitry. The image sensor may capture an interleaved image having rows of long-exposure pixel values that are interleaved with rows of short-exposure pixel values. The image sensor may separate the interleaved image into first and second images each having empty image pixel values. The processing circuitry may generate interpolated long-exposure and interpolated short-exposure images by generating chroma-filtered interpolated pixel values for the empty pixel values in the first and second images. The processing circuitry may perform interpolation operations along one or more directions for the empty image pixels based on whether the empty image pixels are within a texture area or on a dominant edge of the captured image. The processing circuitry may combine the interpolated long-exposure image and the interpolated short-exposure image to generate a high-dynamic-range image.

18 Claims, 6 Drawing Sheets

(51) Int. Cl.
*G06K 9/00* (2006.01)
*G06T 5/00* (2006.01)
*H04N 9/04* (2006.01)

(56) References Cited

U.S. PATENT DOCUMENTS

| | | |
|---|---|---|
| 6,518,558 B1 | 2/2003 | Bohm et al. |
| 7,084,905 B1 | 8/2006 | Nayar et al. |
| 7,382,407 B2 | 6/2008 | Cho et al. |
| 7,397,509 B2 | 7/2008 | Krymski |
| 7,907,209 B2 | 3/2011 | Au et al. |
| 7,911,518 B2 | 3/2011 | Yosefin |
| 8,013,919 B2 | 9/2011 | Yaffe et al. |
| 8,237,813 B2 | 8/2012 | Garten |
| 8,279,328 B2 | 10/2012 | Lahav et al. |
| 8,305,487 B2 | 11/2012 | Cha et al. |
| 8,405,750 B2 | 3/2013 | Smith et al. |
| 2002/0180875 A1 | 12/2002 | Guidash |
| 2003/0038296 A1 | 2/2003 | Merrill |
| 2003/0103158 A1 | 6/2003 | Barkan et al. |
| 2003/0169359 A1 | 9/2003 | Merrill et al. |
| 2004/0189844 A1 | 9/2004 | McCaffrey et al. |
| 2005/0045980 A1 | 3/2005 | Guidash |
| 2005/0099504 A1 | 5/2005 | Nayar et al. |
| 2005/0128327 A1 | 6/2005 | Bencuya et al. |
| 2005/0167574 A1 | 8/2005 | He et al. |
| 2006/0145203 A1 | 7/2006 | Toros et al. |
| 2006/0192867 A1 | 8/2006 | Yosefin |
| 2007/0040922 A1 | 2/2007 | McKee et al. |
| 2007/0285526 A1 | 12/2007 | Mann et al. |
| 2008/0158398 A1 | 7/2008 | Yaffe et al. |
| 2008/0219585 A1 | 9/2008 | Kasai et al. |
| 2008/0267522 A1 | 10/2008 | Kobayashi |
| 2009/0021612 A1 | 1/2009 | Hamilton et al. |
| 2009/0040349 A1 | 2/2009 | Xu |
| 2009/0040364 A1 | 2/2009 | Rubner |
| 2009/0091645 A1* | 4/2009 | Trimeche et al. ............ 348/273 |
| 2009/0256942 A1 | 10/2009 | McCaffrey et al. |
| 2009/0268063 A1 | 10/2009 | Ellis-Monaghan et al. |
| 2009/0273696 A1 | 11/2009 | Krymski |
| 2010/0259636 A1 | 10/2010 | Tzur et al. |
| 2011/0090365 A1 | 4/2011 | Cha et al. |
| 2012/0236169 A1 | 9/2012 | Oh et al. |
| 2012/0287294 A1 | 11/2012 | Kaizu et al. |
| 2012/0328025 A1 | 12/2012 | Chang et al. |

OTHER PUBLICATIONS

Huai Dong Li et al., U.S. Appl. No. 13/755,988, filed Jan. 31, 2013.

* cited by examiner

SYSTEMS AND METHODS FOR GENERATING INTERPOLATED HIGH-DYNAMIC-RANGE IMAGES

This application claims the benefit of provisional patent application No. 61/608,493, filed Mar. 8, 2012 which is hereby incorporated by reference herein in its entirety.

BACKGROUND

The present invention relates to imaging devices and, more particularly, to high-dynamic-range imaging systems.

Image sensors are commonly used in electronic devices such as cellular telephones, cameras, and computers to capture images. In a typical arrangement, an electronic device is provided with an image sensor having an array of image pixels and a corresponding lens. Some electronic devices use arrays of image sensors and arrays of corresponding lenses.

In certain applications, it may be desirable to capture high-dynamic range images. While highlight and shadow detail may be lost using a conventional image sensor, highlight and shadow detail may be retained using image sensors with high-dynamic-range imaging capabilities.

Common high-dynamic-range (HDR) imaging systems use an interleaved exposure image capture method. In the interleaved exposure method, interleaved images are captured having rows of long-exposure image pixel values are interleaved with rows of short-exposure image pixel values. The short-exposure and long-exposure image pixel values are typically interpolated using edge-based interpolation in which pixel values are interpolated along a direction of maximum pixel correlation.

When generating HDR images using conventional edge-based interpolation methods, conventional imaging systems can misidentify edges in a captured image, which can result in undesirable artifacts in the final HDR image.

It would therefore be desirable to provide improved systems and methods for interleaved high-dynamic-range imaging.

DETAILED DESCRIPTION

Imaging systems are widely used in electronic devices such as digital cameras, computers, cellular telephones, and other electronic devices. These electronic devices may include image sensors that gather incoming light from a scene to capture an image. The image sensors may include at least one image pixel array. The pixels in the image pixel array may include photosensitive elements such as photodiodes that convert the incoming light into digital data. Image sensors may have any number of pixels (e.g., hundreds or thousands or more). A typical image sensor may, for example, have hundreds of thousands or millions of pixels (e.g., megapixels).

Figure 1:
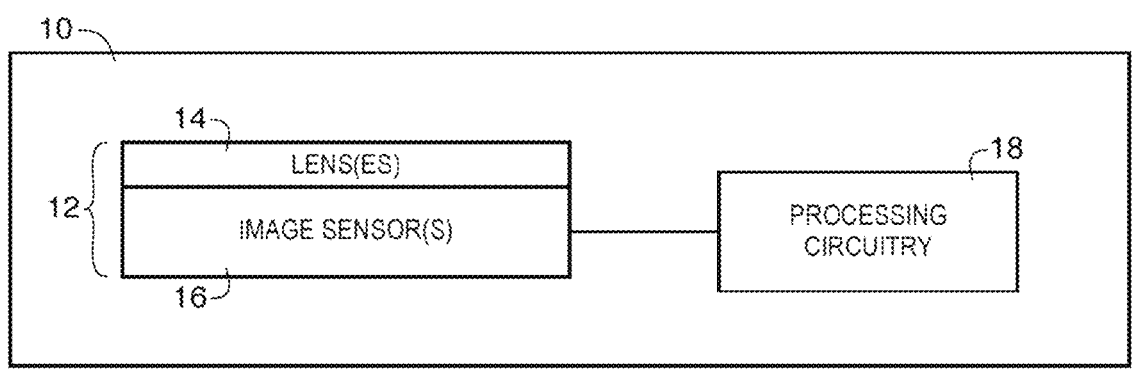
FIG. 1 shows an illustrative imaging device that can be used to capture high-dynamic-range images in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Device 10 may include a camera module such as camera module 12 coupled to control circuitry such as processing circuitry 18. Camera module 12 may be used to convert incoming light into digital image data. Camera module 12 may include one or more lenses 14 and one or more corresponding image sensors 16. During image capture operations, light from a scene may be focused onto each image sensor 16 using a respective lens 14. Lenses 14 and image sensors 16 may be mounted in a common package and may provide image data to processing circuitry 18. Processing circuitry 18 may sometimes be referred to herein as image processing circuitry 18.

Processing circuitry 18 may include one or more integrated circuits (e.g., image processing circuits, microprocessors, storage devices such as random-access memory and non-volatile memory, etc.) and may be implemented using components that are separate from image sensor 16 and/or that form part of image sensor 16 (e.g., circuits that form part of an integrated circuit that controls or reads pixel signals from image pixels in an image pixel array on image sensor 16 or an integrated circuit within image sensor 16). Image data that has been captured by image sensor 16 may be processed and stored using processing circuitry 18. Processed image data may, if desired, be provided to external equipment (e.g., a computer or other device) using wired and/or wireless communications paths coupled to processing circuitry 18.

The dynamic range of an image may be defined as the luminance ratio of the brightest element in a given scene to the darkest element in the given scene. Typically, cameras and other imaging devices capture images having a dynamic range that is smaller than that of real-world scenes. High-dynamic-range (HDR) imaging systems are therefore often used to capture representative images of scenes that have regions with high contrast, such as scenes that have portions in bright sunlight and portions in dark shadows.

An image may be considered an HDR image if it has been generated using imaging processes or software processing designed to increase dynamic range. As an example, HDR images may be captured by a digital camera using an interleaved integration (or interleaved exposure (IE)) process. In an interleaved exposure process, interleaved images may be captured by an image sensor. The interleaved images may have rows of long-exposure image pixel values that are interleaved (or interspersed) with rows of short-exposure image pixel values.

Figure 2:
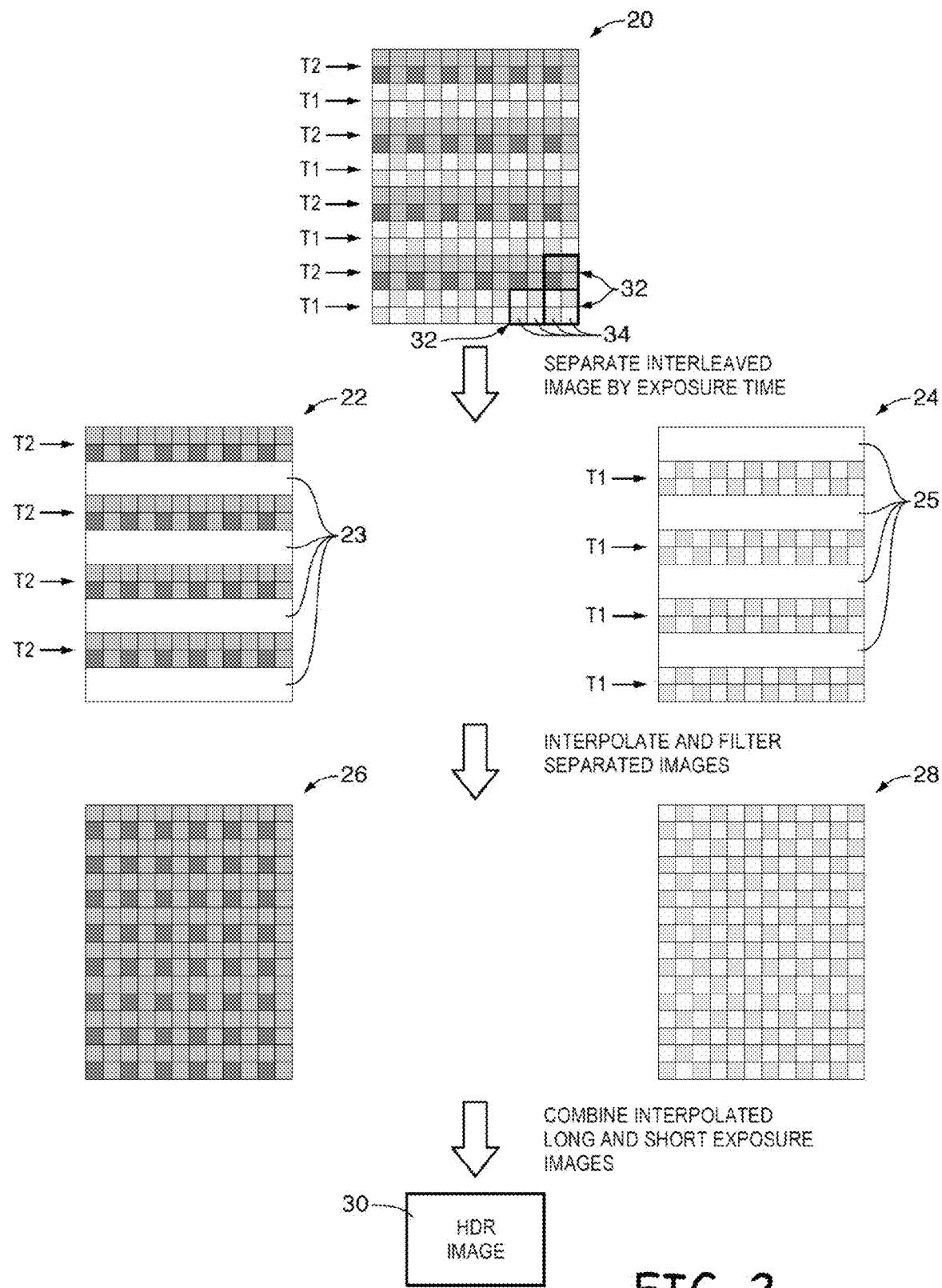
FIG. 2 is a diagram showing illustrative steps involved in creating high-dynamic-range images by separating and interpolating images captured with interleaved exposure times in accordance with an embodiment of the present invention.

FIG. 2 is a diagram showing illustrative steps that may be performed by processing circuitry such as processing circuitry 18 of FIG. 1 to generate HDR images using interleaved images captured by image sensor 16. As shown in FIG. 2, image sensor 16 may capture an interleaved image 20 from a scene. Interleaved image 20 may have rows of pixel values captured using long-exposure time T1 interleaved with rows of pixel values captured using short-exposure time T2. Interleaved images such as interleaved image 20 may be captured by alternating exposure times for every two rows of image pixels 34.

Processing circuitry 18 may separate interleaved image 20 into a separated short-exposure image 22 and a separated long-exposure image 24. Separated short-exposure image 22 may, for example, include the rows of interleaved image 20 that were captured using short-exposure time T2 and rows 23 of empty pixel values (e.g., pixel values corresponding to rows for which long-exposure time T1 was used). Separated long-exposure image 24 may include the rows of interleaved image 20 that were captured using long-exposure time T1 and rows 25 of empty pixel values (e.g., pixel values corresponding to rows for which short-exposure time T2 was used).

Processing circuitry 18 may subsequently interpolate (deinterlace) and filter separated short-exposure image 22 to form interpolated short-exposure image 26 and may interpolate and filter separated long-exposure image 24 to form interpolated long-exposure image 28. Interpolated short-exposure image 26 may, for example, include interpolated values for pixels located in rows for which long-exposure pixel values were captured by image sensor 16 (e.g., interpolated values for pixels in rows 23 of separated short-exposure image 22 may be generated). Interpolated long-exposure image 28 may include interpolated values for pixels located in rows for which short-exposure pixel values were captured by image sensor 16 (e.g., interpolated values for pixels in rows 25 of separated long-exposure image 24 may be generated). Processing circuitry 18 may then combine interpolated images 26 and 28 to form high-dynamic-range image 30.

Each pair of pixel value rows captured with a particular one of exposure times T1 and T2 in interleaved image 20 may include a number of pixel values 34 arranged in repeating two pixel by two pixel unit cells 32. Image sensor pixels in image sensor 16 may be provided with a color filter array which allows a single image sensor to sample different colors of light and to generate pixel values corresponding to each sampled color of light. Each pixel value 34 in interleaved image 20 may, for example, correspond to a particular color of light. Each unit cell 32 in interleaved image 20 may include four pixel values each corresponding to a particular color of light (e.g., so that pixel values 34 are captured for the same colors in each unit cell 32 across interleaved image 20).

As an example, image sensor pixels in image sensor 16 may be provided with a color filter array that allows a single image sensor to sample red, green, and blue (RGB) light using corresponding red, green, and blue image sensor pixels arranged in a Bayer mosaic pattern. The Bayer mosaic pattern consists of a repeating unit cell 32 of two-by-two image pixels, with two green image pixels diagonally opposite one another and adjacent to a red image pixel diagonally opposite to a blue image pixel. In this way, image sensor pixels that are captured using the Bayer mosaic pattern may generate blue image signals in response to blue light, red image signals in response to red light, and green image signals in response to green light. Interleaved image 20 may be captured using a Bayer mosaic pattern so that blue, red, and green image pixel values are captured for each unit cell 32 of image pixels values 34 in interleaved image 20.

Figure 3:
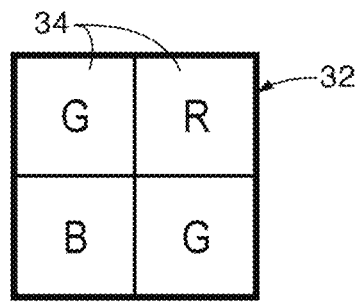
FIG. 3 is a diagram of an illustrative pixel unit cell having color image pixel values in accordance with an embodiment of the present invention.

FIG. 3 shows an illustrative unit cell of pixel values that may be captured by image sensor 16 when generating interleaved image 20. As shown in FIG. 3, unit cell 32 includes two green pixel values diagonally opposite one another and adjacent to a red image pixel value diagonally opposite to a blue image pixel value (e.g., pixel values 34 of unit cell 32 may be captured by image sensor 16 using a Bayer color filter array).

The example of FIG. 3 is merely illustrative. If desired, any color filter array may be used to capture interleaved image 20. For example, a Bayer-type pattern color filter array in which green image filters are replaced with clear image filters may be used to capture interleaved image 20. In this example, each unit cell 32 of pixel values 34 may include two clear pixel values diagonally opposite one another and adjacent to a red pixel value diagonally opposite to a blue pixel value. In general, pixel values 34 may correspond to any desired color of light captured by image sensor 16.

Figure 4:
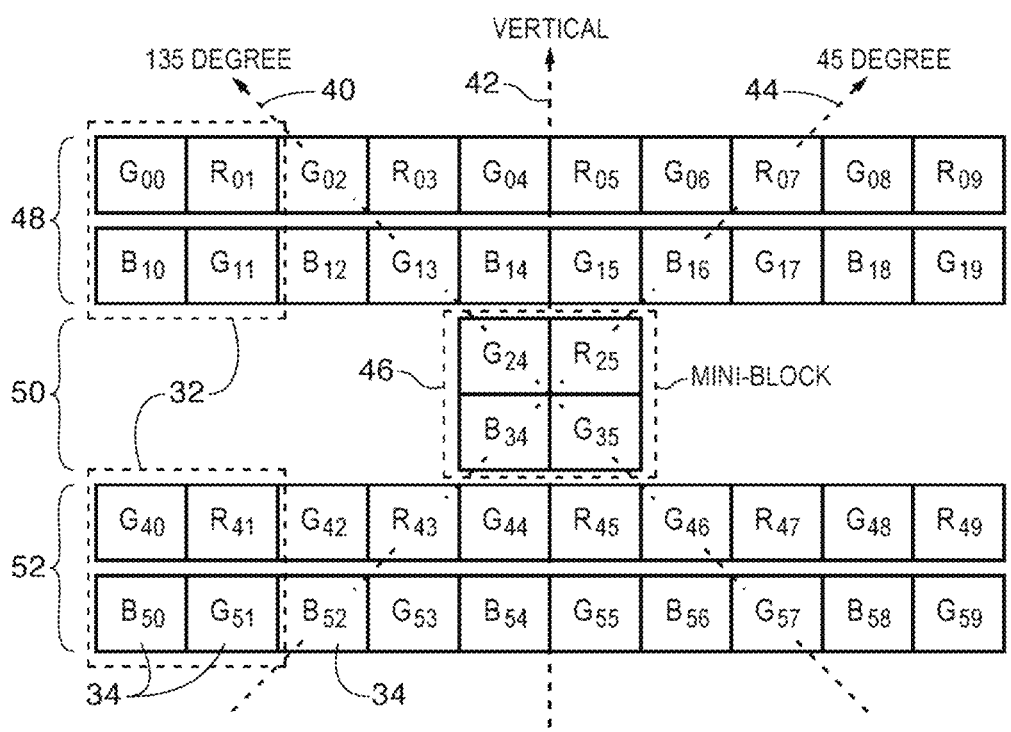
FIG. 4 is a diagram of an illustrative mini-block of pixel values that may be interpolated along one or more directions for generating interpolated images of the type shown in FIG. 2 in accordance with an embodiment of the present invention.

FIG. 4 shows an illustrative diagram of interpolated pixel values that may be generated based on pixel values in adjacent rows of a separated image (e.g., interpolated pixel values that may be generated for separated long-exposure image 24 or separated short-exposure image 22 of FIG. 2). As shown in FIG. 4, pixel values for a mini-block 46 of pixels may be generated using an interpolation of captured pixel values 34 from upper rows 48 and lower rows 52 of pixel values arranged in a Bayer pattern (e.g., using one or more of captured pixel values $G_{00}$, $R_{01}$, $G_{02}$, $B_{10}$, $B_{12}$, $G_{46}$, $R_{49}$, $B_{52}$, $G_{55}$, $B_{50}$, $R_{05}$, etc.).

For example, mini-block 46 may include interpolated green pixel values $G_{24}$ and $G_{35}$, interpolated red pixel value $R_{25}$, and interpolated blue pixel value $B_{34}$ (e.g., mini-block 46 may be an interpolated unit cell 32 of pixel values 34). Interpolated pixel values $G_{24}$, $G_{35}$, $R_{25}$, and $B_{34}$ may, for example, be generated based on the captured pixel values from rows 48 and rows 52 of pixel values 34 in unit cells 32. Processing circuitry 18 may generate interpolated pixel values for multiple mini-blocks in mini-block row 50 for the associated separated image. For example, processing circuitry 18 may generate interpolated pixel values for mini-blocks in each row 23 of separated short-exposure image 22 and in each of row 25 of separated long-exposure image 24 (FIG. 2).

Figure 5:
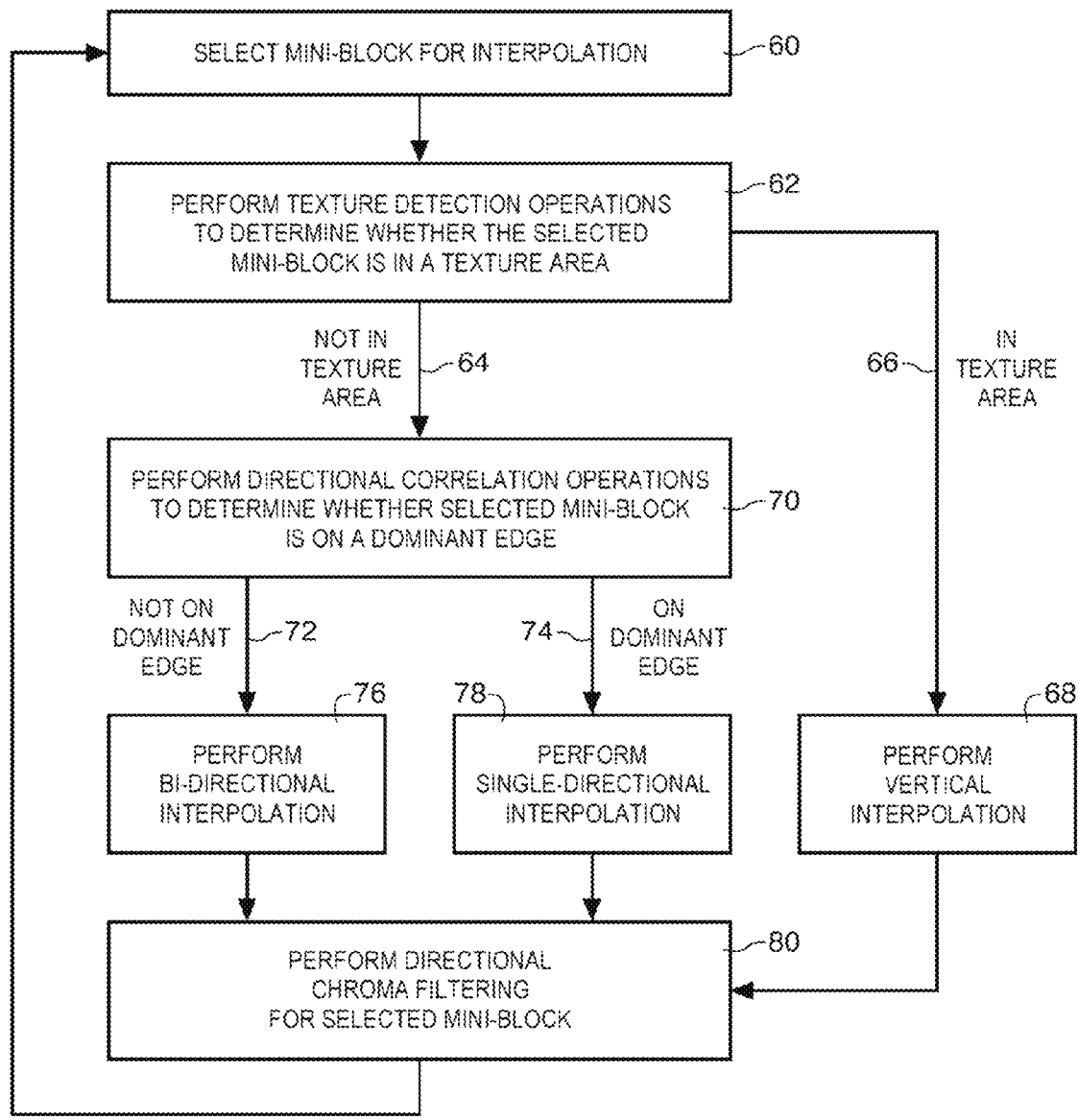
FIG. 5 is a flow chart showing how processing circuitry in an imaging device of the type shown in FIG. 1 may generate chroma-filtered interpolated image pixel values for generating high-dynamic-range images in accordance with an embodiment of the present invention

FIG. 5 shows a flow chart of illustrative steps that may be performed by processing circuitry 18 to generate interpolated and filtered pixel values for mini-blocks such as mini-block 46 of FIG. 4. The steps of FIG. 5 may, for example, be performed by processing circuitry 18 using an interpolated image such as interpolated short-exposure image 26 or interpolated long-exposure image 28 of FIG. 2.

At step 60, processing circuitry 18 may select a mini-block for interpolation. For example, processing circuitry 18 may select mini-block 46 of FIG. 4 for interpolation.

At step 62, processing circuitry 18 may perform texture detection operations on selected mini-block 46 to determine whether the selected mini-block is within a texture area of the captured image (e.g., an area of the captured image having a relatively large number of edges of objects from the imaged scene). Processing circuitry 18 may determine whether mini-block 46 is within a texture area by applying a high-pass filter horizontally on green pixel values from the row of pixel values above mini-block 46 (e.g., by applying a high pass filter to green values $G_{11}$, $G_{13}$, $G_{15}$, $G_{17}$, and $G_{19}$ from the unit cells 32 in pixel value rows 48 of FIG. 4) and from the row of pixel values below mini-block 46 (e.g., by applying a high pass filter to green values $G_{40}$, $G_{42}$, $G_{44}$, $G_{46}$, and $G_{48}$ from the unit cells 32 in pixel value rows 52). For example, processing circuitry 18 may generate six high-pass filtered green pixel values by computing |2*$G_{13}$−$G_{11}$−$G_{15}$|, ⊕2*$G_{15}$−$G_{13}$−$G_{17}$|, |2*$G_{17}$−$G_{15}$−$G_{19}$|, |2*$G_{42}$−$G_{40}$−$G_{44}$|, |2*$G_{44}$−$G_{42}$−$G_{46}$|, and |2*$G_{46}$−$G_{44}$−$G_{48}$|.

Processing circuitry 18 may determine the number of high-pass filtered green pixel values that exceed a predetermined threshold. If the number of high-pass filtered green pixel values that exceed the predetermined threshold is greater than a count threshold (e.g., a count threshold of three high-pass filtered green pixel values, etc.), processing circuitry 18 may identify mini-block 46 as being within a texture area. Processing may subsequently proceed to step 68 via path 66 of FIG. 5.

At step 68, processing circuitry 18 may perform vertical interpolation operations for mini-block 46 (e.g., interpolation for mini-block 46 in a vertical direction as illustrated by arrow 42 of FIG. 4). For example, processing circuitry 18 may compute interpolated pixel values for mini-block 46 as linear combinations of captured pixel values located above and below mini-block 46 (e.g., captured pixel values for pixels along arrow 42). If desired, processing circuitry 18 may compute the interpolated pixel values for mini-block 46 as an average of captured pixel values above and below mini-block 46. For example, each interpolated pixel value for mini-cell 46 may be computed using the following equations:

$$G_{24}=(G_{04}+G_{44})/2 \quad (1)$$

$$R_{25}=(R_{05}+R_{45})/2 \quad (2)$$

$$B_{34}=(B_{14}+B_{54})/2 \quad (3)$$

$$G_{35}=(G_{15}+G_{55})/2. \quad (4)$$

Processing may subsequently proceed to step 80 to perform directional chroma filtering on mini-block 46.

If the number of high-pass filtered green pixel values that exceed the predetermined threshold is less than or equal to the count threshold, processing circuitry 18 may identify mini-block 46 as not being within a texture area. Processing may subsequently proceed to step 70 via path 64.

At step 70, processing circuitry 18 may perform directional pixel correlation operations on selected mini-block 46 to determine whether mini-block 46 is on a dominant edge (e.g., the edge of an imaged object in a scene) in the captured image. Directional pixel correlations for mini-block 46 may be determined based on the change in captured pixel values along different directions relative to mini-block 46.

As examples, processing circuitry 18 may determine directional pixel correlations for mini-block 46 along a vertical direction as illustrated by arrow 42 of FIG. 4, along a 45 degree direction as illustrated by arrow 44, or along a 135 degree direction as illustrated by arrow 40. Processing circuitry 18 may generate directional pixel correlation values for each direction as a linear combination of captured pixel values along the associated direction (e.g., processing circuitry 18 may generate directional pixel correlation values for each direction as a function of the change in pixel values along the associated direction). For example, processing circuitry 18 may compute a directional pixel correlation value $C_{90}$ for mini-block 46 in the vertical direction, a directional pixel correlation value $C_{45}$ in the 45 degree direction, and a directional pixel correlation value $C_{135}$ in the 135 degree direction using the following equations:

$$C_{90}=4*|G_{04}-G_{44}|+|G_{15}-G_{55}|+|G_{13}-G_{53}|+|R_{03}-R_{43}|+|R_{05}-R_{45}| \quad (5)$$

$$C_{45}=2*|G_{15}-G_{42}|+2*|G_{13}-G_{40}|+2*|G_{17}-G_{44}|+|R_{07}-R_{43}|+|R_{05}-R_{41}| \quad (6)$$

$$C_{135}=2*|G_{13}-G_{46}|+2*|G_{15}-G_{48}|+2*|G_{11}-G_{44}|+|R_{03}-R_{47}|+|R_{01}-R_{45}|. \quad (7)$$

Processing circuitry 18 may compare the directional pixel correlation values and may label the directional pixel correlation value having the smallest magnitude as $C_{MIN}$ and may label the directional pixel correlation value having the second smallest magnitude as $C_{SECOND\_MIN}$. For example, if correlation value $C_{90}$ has a magnitude of 1.1, correlation value $C_{45}$ has a magnitude of 0.9, and correlation value $C_{135}$ has a magnitude of 0.8, directional pixel correlation value $C_{135}$ may be labeled $C_{MIN}$ and directional pixel correlation value $C_{45}$ may be labeled $C_{MIN\_SECOND}$.

Processing circuitry 18 may compare the magnitude of $C_{MIN\_SECOND}$ to a constant multiple of the magnitude of $C_{MIN}$. If the magnitude of $C_{MIN\_SECOND}$ is greater than a constant K times the magnitude of $C_{MIN}$ (e.g., if $C_{MIN\_SECOND}$>K*$C_{MIN}$), processing circuitry 18 may determine that mini-block 46 is in a dominant edge of the captured image. Constant K may be any desired constant having a value between 1 and 2. As an example, constant K may have a value of 1.5.

If mini-block 46 is within a dominant edge of the captured image, processing may proceed to step 68 via path 74 of FIG. 5. At step 74, circuitry 18 may perform single-directional interpolation for mini-block 46. For example, circuitry 18 may perform interpolation operations for mini-block 46 along the direction having the smallest directional pixel correlation value (e.g., circuitry 18 may compute a linear combination such as an average of captured pixel values along the direction associated with $C_{MIN}$). The interpolated pixel values for mini-block 46 may, for example, be determined using the following equations:

$$G_{24} = \begin{cases} \frac{(G_{04}+G_{44})}{2}, & \text{if } C_{MIN} = C_{90} \\ \frac{(G_{15}+G_{42})}{2}, & \text{if } C_{MIN} = C_{45} \\ \frac{(G_{13}+G_{46})}{2}, & \text{if } C_{MIN} = C_{135} \end{cases} \quad (8)$$

$$G_{35} = \begin{cases} \frac{(R_{15}+R_{55})}{2}, & \text{if } C_{MIN} = C_{90} \\ \frac{(R_{17}+R_{44})}{2}, & \text{if } C_{MIN} = C_{45} \\ \frac{(R_{13}+R_{46})}{2}, & \text{if } C_{MIN} = C_{135} \end{cases} \quad (9)$$

$$R_{25} = \begin{cases} \frac{(R_{05}+R_{45})}{2}, & \text{if } C_{MIN} = C_{90} \\ \frac{(R_{07}+R_{43})}{2}, & \text{if } C_{MIN} = C_{45} \\ \frac{(R_{03}+R_{47})}{2}, & \text{if } C_{MIN} = C_{135} \end{cases} \quad (10)$$

$$B_{34} = \begin{cases} \frac{(B_{14}+B_{54})}{2}, & \text{if } C_{MIN} = C_{90} \\ \frac{(B_{16}+B_{52})}{2}, & \text{if } C_{MIN} = C_{45} \\ \frac{(B_{12}+B_{56})}{2}, & \text{if } C_{MIN} = C_{135}. \end{cases} \quad (11)$$

If mini-block 46 is not within a dominant edge of the captured image, processing may proceed to step 76 via path 72. At step 76, circuitry 18 may perform interpolation operations for mini-block 46 along multiple directions. For example, circuitry 18 may perform bi-directional interpolation for mini-block 46 (e.g., interpolation along two different directions relative to mini-block 46). For example, circuitry 18 may perform interpolation operations for mini-block 46 along the direction having the second smallest directional pixel correlation value and along the direction having the smallest directional pixel correlation value (e.g., circuitry 18 may compute interpolated pixel values for mini-block 46 by calculating a linear combination of captured pixel values along the directions associated with $C_{MIN}$ and $C_{SECOND\_MIN}$). If desired, the interpolated pixel values for mini-block 46 may be computed as an average of pixel values interpolated along the direction of $C_{MIN}$ and pixel values interpolated along the direction of $C_{SECOND\_MIN}$. The interpolated pixel values for mini-block 46 may, for example, be determined using the following equations:

$$G_{24} = \begin{cases} \frac{\left(G_{24MIN} + \frac{(G_{04}+G_{44})}{2}\right)}{2}, & \text{if } C_{SECOND\_MIN} = C_{90} \\ \frac{\left(G_{24MIN} + \frac{(G_{15}+G_{42})}{2}\right)}{2}, & \text{if } C_{SECOND\_MIN} = C_{45} \\ \frac{\left(G_{24MIN} + \frac{(G_{13}+G_{46})}{2}\right)}{2}, & \text{if } C_{SECOND\_MIN} = C_{135} \end{cases} \quad (12)$$

$$G_{35} = \begin{cases} \frac{\left(G_{35MIN} + \frac{(G_{15}+G_{55})}{2}\right)}{2}, & \text{if } C_{SECOND\_MIN} = C_{90} \\ \frac{\left(G_{35MIN} + \frac{(G_{17}+G_{44})}{2}\right)}{2}, & \text{if } C_{SECOND\_MIN} = C_{45} \\ \frac{\left(G_{35MIN} + \frac{(G_{13}+G_{46})}{2}\right)}{2}, & \text{if } C_{SECOND\_MIN} = C_{135} \end{cases} \quad (13)$$

$$R_{25} = \begin{cases} \frac{\left(R_{25MIN} + \frac{(R_{05}+R_{45})}{2}\right)}{2}, & \text{if } C_{SECOND\_MIN} = C_{90} \\ \frac{\left(R_{25MIN} + \frac{(R_{07}+R_{43})}{2}\right)}{2}, & \text{if } C_{SECOND\_MIN} = C_{45} \\ \frac{\left(R_{25MIN} + \frac{(R_{03}+R_{47})}{2}\right)}{2}, & \text{if } C_{SECOND\_MIN} = C_{135} \end{cases} \quad (14)$$

$$B_{34} = \begin{cases} \frac{\left(B_{34MIN} + \frac{(B_{14}+B_{54})}{2}\right)}{2}, & \text{if } C_{SECOND\_MIN} = C_{90} \\ \frac{\left(B_{34MIN} + \frac{(B_{16}+B_{52})}{2}\right)}{2}, & \text{if } C_{SECOND\_MIN} = C_{45} \\ \frac{\left(B_{34MIN} + \frac{(B_{12}+B_{56})}{2}\right)}{2}, & \text{if } C_{SECOND\_MIN} = C_{135}, \end{cases} \quad (15)$$

where $G_{24MIN}$, $G_{35MIN}$, $R_{25MIN}$, and $B_{34MIN}$ are pixel values for mini-block 46 interpolated along the direction of $C_{MIN}$. For example, values $G_{24MIN}$, $G_{35MIN}$, $R_{25MIN}$, and $B_{34MIN}$ may be calculated using equations 8-11, respectively (e.g., where $G_{24MIN}$ is substituted for $G_{24}$ in equation 8, $G_{35MIN}$ is substituted for $G_{35}$ in equation 9, etc.).

In some cases, interpolated pixel values $G_{24}$, $G_{35}$, $R_{25}$, and $B_{34}$ may include color artifacts that do not accurately reflect the imaged scene. If desired, processing circuitry 18 may perform filtering operations such as directional chroma filtering on interpolated pixel values $G_{24}$, $G_{35}$, $R_{25}$, and $B_{34}$ to reduce color artifacts (e.g., by applying a chroma filter to interpolated pixel values $G_{24}$, $G_{35}$, $R_{25}$, and $B_{34}$ in a particular direction).

At step 80, processing circuitry 18 may perform chroma filtering on the interpolated pixel values in mini-block 46 to reduce color artifacts in the interpolated pixel values. For example, processing circuitry 18 may perform directional chroma filtering for mini-block 46. Processing circuitry 18 may perform directional chroma filtering by applying a low-pass filter to the B-G and G-R pixel value domains around mini-block 46 to generate low-pass filter values (e.g., by applying a low-pass filter to difference values computed between blue and green pixel values and between green and red pixel values). Circuitry 18 may modify the interpolated pixel values using the low-pass filter values to generate chroma filtered interpolated pixel values for mini-block 46.

If the pixel values in mini-block 46 were interpolated along the vertical direction (e.g., if mini-block 46 was determined to be within a texture area while processing step 62 or if single-directional interpolation was performed along vertical direction 42 of FIG. 4), circuitry 18 may compute difference values between blue and green image pixels and between green and red image pixels in a vertical direction with respect to mini-block 46. Difference values computed for blue and green pixels in a vertical direction may be used to generate a low-pass filter value such as vertical filter value $BG_{LOW\_PASS}$ and difference values computed for red and green pixels in a vertical direction may be used to generate a low-pass filter value such as vertical filter value $GR_{LOW\_PASS}$.

Figure 6:
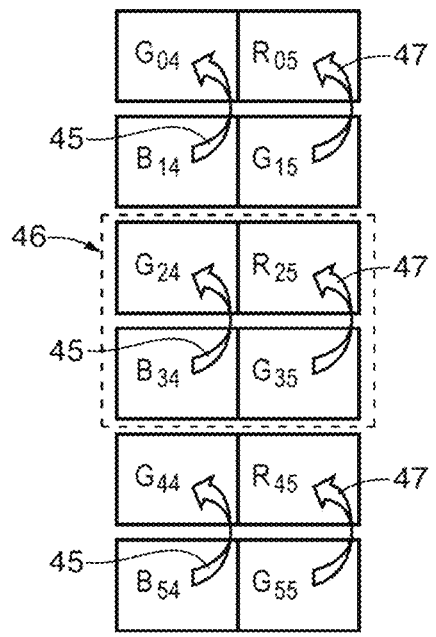
FIG. 6 is a diagram showing how difference values may be computed for pixel values in a vertical direction for generating chroma-filtered interpolated pixel values in accordance with an embodiment of the present invention.

FIG. 6 is an illustrative diagram showing how difference values may be computed for mini-block 46 in a vertical direction with respect to mini-block 46. As shown in FIG. 6, difference values for blue and green pixels may be computed by subtracting pixel values along arrows 45 and difference values for red and green pixels may be computed by subtracting pixel values along arrows 47. Vertical filter value $BG_{LOW\_PASS}$ may be computed as a linear combination of the blue and green difference values for pixels in the left column of FIG. 6. For example, vertical filter value $BG_{LOW\_PASS}$ may be computed using the following equation:

$$BG_{LOW\_PASS} = (2*(B_{34}-G_{24})+(B_{14}-G_{04})+(B_{54}-G_{44}))/4. \quad (16)$$

In equation 16, $(B_{34}-G_{24})$, $(B_{14}-G_{04})$, and $(B_{54}-G_{44})$ are difference values for blue and green pixels in the left column of FIG. 6. Vertical filter value $GR_{LOW\_PASS}$ may be computed as a linear combination of the red and green difference values for pixels in the right column of FIG. 6. For example, vertical filter value $GR_{LOW\_PASS}$ may be computed using the following equation:

$$GR_{LOW\_PASS} = (2*(G_{35}-R_{25})+(G_{15}-R_{05})+(G_{55}-R_{45}))/4. \quad (17)$$

In equation 17, $(G_{35}-R_{25})$, $(G_{15}-R_{05})$, and $(G_{55}-R_{45})$ are difference values for red and green pixels in the right column of FIG. 6.

Processing circuitry 18 may subsequently compare the difference between vertical filter value $BG_{LOW\_PASS}$ and interpolated value $B_{34}$ to a maximum pixel value MAX to generate a chroma-filtered interpolated pixel value $G_{24}'$ for interpolated pixel value $G_{24}$ in mini-block 46 (e.g., maximum pixel value MAX may be the maximum possible pixel value of each pixel in mini-block 46). For example, if each pixel value is represented by 8-bit data, the associated maximum pixel value MAX is 255, if each pixel value is represented by 10 bit data, the associated maximum pixel value MAX is 1023, etc. For example, chroma-filtered interpolated pixel value $G_{24}'$ may be computed using the following equation:

$$G'_{24} = \begin{cases} B_{34} - BG_{LOW\_PASS}, & \text{if } 0 < B_{34} - BG_{LOW\_PASS} < \text{MAX} \\ 0, & \text{if } B_{34} - BG_{LOW\_PASS} \leq 0 \\ \text{MAX}, & \text{if } B_{34} - BG_{LOW_{PASS}} \geq \text{MAX}. \end{cases} \quad (18)$$

Processing circuitry 18 may compare the sum of vertical filter value $BG_{LOW\_PASS}$ and interpolated value $G_{24}$ to maximum pixel value MAX to generate a chroma-filtered interpolated pixel value $B_{34}'$ for mini-block 46. For example, chroma-filtered interpolated pixel value $B_{34}'$ may be computed using the following equation:

$$B'_{34} = \begin{cases} G_{24} + BG_{LOW\_PASS}, & \text{if } 0 < G_{24} + BG_{LOW\_PASS} < \text{MAX} \\ 0, & \text{if } G_{24} + BG_{LOW\_PASS} \leq 0 \\ \text{MAX}, & \text{if } G_{24} + BG_{LOW\_PASS} \geq \text{MAX}. \end{cases} \quad (19)$$

Processing circuitry 18 may compare the difference between vertical filter value $GR_{LOW\_PASS}$ and interpolated value $G_{35}$ to maximum pixel value MAX to generate a chroma-filtered interpolated pixel value $R_{25}'$ for mini-block 46. For example, chroma-filtered interpolated pixel value $R_{25}'$ may be computed using the following equation:

$$R'_{25} = \begin{cases} G_{35} - GR_{LOW\_PASS}, & \text{if } 0 < G_{35} - GR_{LOW\_PASS} < \text{MAX} \\ 0, & \text{if } G_{35} - GR_{LOW\_PASS} \leq 0 \\ \text{MAX}, & \text{if } G_{35} - GR_{LOW\_PASS} \geq \text{MAX}. \end{cases} \quad (20)$$

Processing circuitry 18 may compare the sum of vertical filter value $GR_{LOW\_PASS}$ and interpolated value $R_{25}$ to maximum value MAX to generate a chroma-filtered interpolated pixel value $G_{35}'$ for mini-block 46. For example, chroma-filtered interpolated pixel value $G_{35}'$ may be computed using the following equation:

$$G'_{35} = \begin{cases} R_{25} + GR_{LOW\_PASS}, & \text{if } 0 < R_{25} + GR_{LOW\_PASS} < \text{MAX} \\ 0, & \text{if } R_{25} + GR_{LOW\_PASS} \leq 0 \\ \text{MAX}, & \text{if } R_{25} + GR_{LOW\_PASS} \geq \text{MAX}. \end{cases} \quad (21)$$

If the interpolated pixel values of mini-block 46 were interpolated along a non-vertical direction (e.g., if bi-directional interpolation was performed or if single-directional interpolation was performed along direction 40 or direction 45 of FIG. 4), circuitry 18 may compute difference values between blue and green image pixels and between green and red image pixels in a horizontal direction with respect to mini-block 46. Difference values computed for blue and green pixels in a horizontal direction may be used to generate a low-pass filter value such as horizontal filter value $BG_{LOW\_PASS}'$ and difference values computed for red and green pixels in a horizontal direction may be used to generate a low-pass filter value such as horizontal filter value $GR_{LOW\_PASS}'$.

Figure 7:
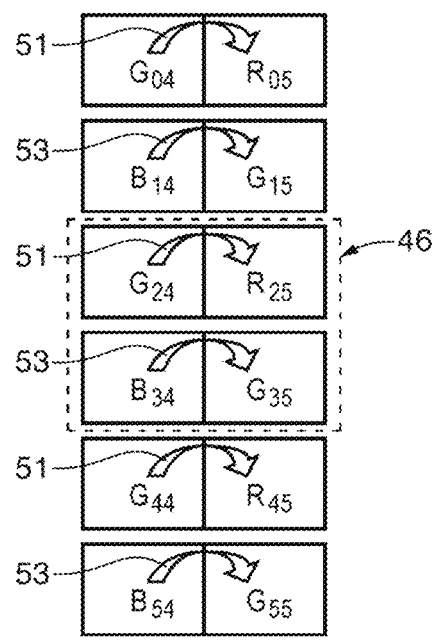
FIG. 7 is a diagram showing how difference values may be computed for pixel values in a horizontal direction for generating chroma-filtered interpolated pixel values in accordance with an embodiment of the present invention.

FIG. 7 is an illustrative diagram showing how difference values may be computed for mini-block 46 in a horizontal direction. As shown in FIG. 7, difference values for blue and green pixels may be computed by subtracting pixel values along arrows 53 and difference values for red and green pixels may be computed by subtracting pixel values along arrows 51. Horizontal filter value $BG_{LOW\_PASS}'$ may be computed as a linear combination of difference values for blue and green pixels in the odd-numbered rows of FIG. 7. For example, horizontal filter value $BG_{LOW\_PASS}'$ may be computed using the following equation:

$$BG_{LOW\_PASS}' = (2*(B_{34}-G_{35})+(B_{14}-G_{15})+(B_{54}-G_{55}))/4. \quad (22)$$

Horizontal filter value $GR_{LOW\_PASS}'$ may be computed as a linear combination of difference values for red and green pixels in the even-numbered rows of FIG. 7. For example, horizontal filter value $GR_{LOW\_PASS}'$ may be computed using the following equation:

$$GR_{LOW\_PASS}' = (2*(G_{24}-R_{25})+(G_{04}-R_{05})+(G_{44}-R_{45}))/4. \quad (23)$$

Processing circuitry 18 may subsequently compare the sum of horizontal filter value $GR_{LOW\_PASS}'$ and interpolated value $R_{25}$ to maximum pixel value MAX to generate chroma-filtered interpolated pixel value $G_{24}'$ for interpolated pixel value $G_{24}$ in mini-block 46. For example, chroma-filtered interpolated pixel value $G_{24}'$ may be computed using the following equation:

$$G'_{24} = \begin{cases} R_{25} + GR'_{LOW\_PASS}, & \text{if } 0 < R_{25} + GR'_{LOW\_PASS} < \text{MAX} \\ 0, & \text{if } R_{25} + GR'_{LOW\_PASS} \leq 0 \\ \text{MAX}, & \text{if } R_{25} + GR'_{LOW\_PASS} \geq \text{MAX}. \end{cases} \quad (24)$$

Processing circuitry 18 may compare the difference between horizontal filter value $GR_{LOW\_PASS}'$ and interpolated value $G_{24}$ to maximum pixel value MAX to generate a chroma-filtered interpolated pixel value $R_{25}'$ for mini-block 46. For example, chroma-filtered interpolated pixel value $R_{25}'$ may be computed using the following equation:

$$R'_{25} = \begin{cases} G_{24} - GR'_{LOW\_PASS}, & \text{if } 0 < G_{24} - GR'_{LOW\_PASS} < \text{MAX} \\ 0, & \text{if } G_{24} - GR'_{LOW\_PASS} \leq 0 \\ \text{MAX}, & \text{if } G_{24} - GR'_{LOW\_PASS} \geq \text{MAX}. \end{cases} \quad (25)$$

Processing circuitry 18 may compare the sum of horizontal filter value $BG_{LOW\_PASS}'$ and interpolated value $G_{35}$ to maximum value MAX to generate a chroma-filtered interpolated pixel value $B_{34}'$ for mini-block 46. For example, chroma-filtered interpolated pixel value $B_{34}'$ may be computed using the following equation:

$$B'_{34} = \begin{cases} G_{35} + BG'_{LOW\_PASS}, & \text{if } 0 < G_{35} + BG'_{LOW\_PASS} < \text{MAX} \\ 0, & \text{if } G_{35} + BG'_{LOW\_PASS} \leq 0 \\ \text{MAX}, & \text{if } G_{35} + BG'_{LOW\_PASS} \geq \text{MAX}. \end{cases} \quad (26)$$

Processing circuitry 18 may compare the difference between horizontal filter value $BG_{LOW\_PASS}'$ and interpolated value $B_{34}$ to maximum value MAX to generate a chroma-filtered interpolated pixel value $G_{35}'$ for mini-block 46. For example, chroma-filtered interpolated pixel value $G_{35}'$ may be computed using the following equation:

$$G'_{35} = \begin{cases} B_{34} - BG'_{LOW\_PASS}, & \text{if } 0 < B_{34} - BG'_{LOW\_PASS} < \text{MAX} \\ 0, & \text{if } B_{34} - BG'_{LOW\_PASS} \leq 0 \\ \text{MAX}, & \text{if } B_{34} - BG'_{LOW\_PASS} \geq \text{MAX}. \end{cases} \quad (27)$$

Processing circuitry 18 may use chroma-filtered interpolated pixel values $G_{35}'$, $B_{34}'$, $R_{25}'$, and $G_{24}'$ to generate interpolated and filtered images 26 and 28 of FIG. 2.

Processing may subsequently loop back to step 60 to select an additional mini-block for interpolation and chroma-filtering (e.g., additional mini-blocks in row 50 of FIG. 4 or in other rows such as rows 23 of separated short-exposure image 22 or rows 25 of separated long-exposure image 24 of FIG. 2). In this way, interpolated and filtered pixel values may be provided for separated short-exposure image 22 and separated long-exposure image 24 to generate interpolated and filtered short-exposure image 26 and interpolated and filtered long-exposure image 28, respectively. Interpolated and filtered images 26 and 28 may be subsequently combined to form high-dynamic-range image 30.

The examples of FIGS. 2-7 are merely illustrative. If desired, pixel values corresponding to any color may be used. For example, image sensor 16 may capture white image data (e.g., clear or white pixel values) in response to white light instead of green image data in response to green light. In this scenario, the green pixel values of equations 1-27 may be replaced with clear (white) pixel values. In general, pixel values corresponding to any desired light color may be used.

Figure 8:
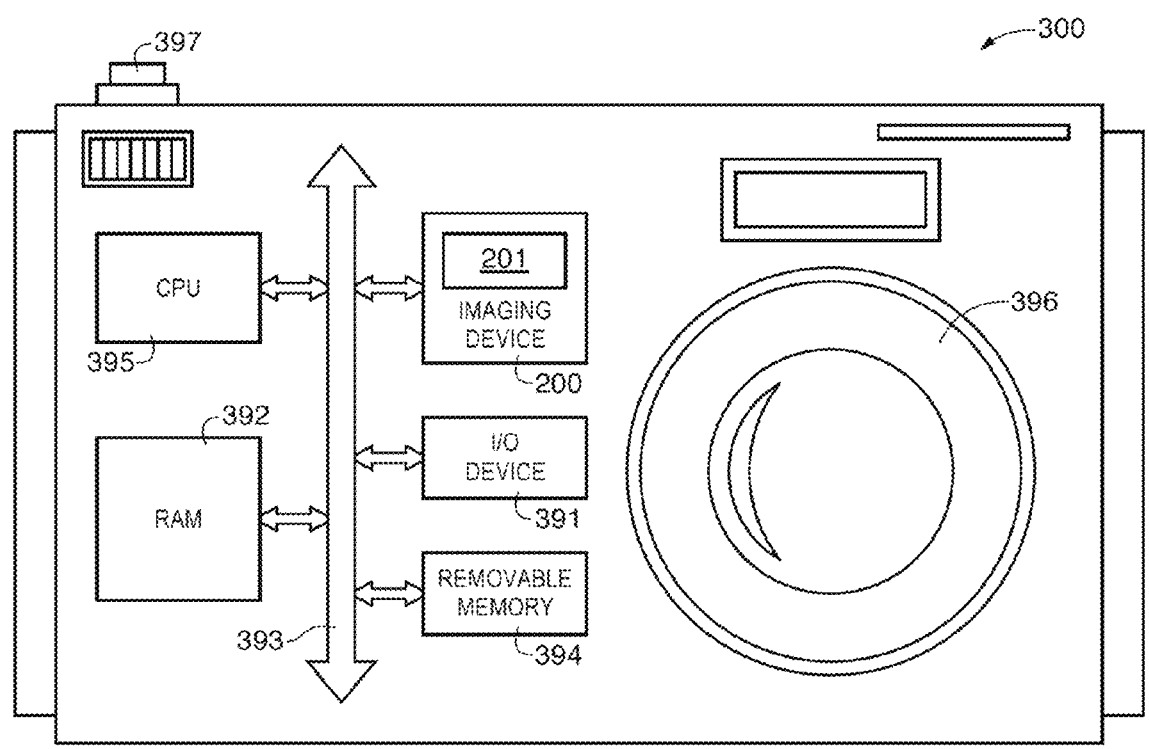
FIG. 8 is a block diagram of a processor system employing the image sensor of FIGS. 1-7 in accordance with an embodiment of the present invention.

FIG. 8 shows in simplified form a typical processor system 300, such as a digital camera, which includes an imaging device such as imaging device 200 (e.g., an imaging device 200 such as camera module 12 of FIG. 1 employing an image processing engine such as processing circuitry 18 and which is configured to generate chroma-filtered interpolated image pixel values for capturing high-dynamic-range images as described in FIGS. 1-7). Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating systems and methods for interpolating and filtering pixel values for generating HDR images of a scene using a camera module having an image sensor and processing circuitry.

The processing circuitry may interpolate color image data for an image captured by the image sensor. The captured image may include a first set of image pixels having captured pixel values and a second set of image pixels having empty (e.g., missing) pixel values. For example, the image sensor may capture an interleaved image having rows of long-exposure pixel values that are interleaved with rows of short-exposure pixel values. The processing circuitry may separate the interleaved image into a first image having rows of captured long-exposure pixel values and rows of empty pixel values and into a second image having rows of captured short-exposure pixel values and rows of empty pixel values.

The processing circuitry may determine whether the second set of image pixels (e.g., the empty image pixels in the first or second separated image) is within a texture area and on a dominant edge of the captured image. The processing circuitry may generate interpolated pixel values for the second set of image pixels and may apply a chroma filter to the interpolated pixel values to generate chroma-filtered interpolated pixel values.

In response to determining that the second set of image pixels is within the texture area of the captured image, the processing circuitry may apply the chroma filter to the interpolated pixel values in a vertical direction (e.g., by calculating difference values between image pixels above and below the second set of image pixels) and may perform vertical interpolation operations for the second set of image pixels (e.g., by computing a linear combination of captured pixel values from image pixels above and below the second set of image pixels).

The processing circuitry may generate directional pixel correlation values for the second set of image pixels in response to determining that the second set of image pixels is outside of the texture area (e.g., directional pixel correlation values that are a measure of the pixel value correlation in the captured image along a particular direction). The processing circuitry may perform interpolation operations for the second set of image pixels along multiple directions in response to determining that the second set of image pixels is not on the dominant edge and may perform interpolation operations along a single direction in response to determining that the second set of image pixels is on the dominant edge in the captured image.

The processing circuitry may generate a high-dynamic-range image using the interpolated pixel values and the captured pixel values. For example, the processing circuitry may generate an interpolated long-exposure image having interpolated long-exposure pixel values (e.g., for the first separated image) and an interpolated short-exposure image having interpolated short-exposure pixel values (e.g., for the second separated image). The processing circuitry may combine the interpolated long-exposure image and the interpolated short-exposure image to generate the high-dynamic-range image.

The image sensor and processing circuitry for interpolating pixel values for high-dynamic-range imaging may be implemented in a system that also includes a central processing unit, memory, input-output circuitry, and an imaging device that further includes a pixel array, a lens for focusing light onto the pixel array, and a data converting circuit.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of using image processing circuitry to interpolate color image data for an image, wherein the image includes a first set of image pixels having captured pixel values and a second set of image pixels having empty pixel values, the method comprising:

with the image processing circuitry, determining whether the second set of image pixels is within a texture area of the image;

with the image processing circuitry, determining whether the second set of image pixels is on a dominant edge of the image, wherein determining whether the second set of pixels is on a dominant edge comprises:
  computing a plurality of directional pixel correlation values for the second set of image pixels;
  determining which of the plurality of directional correlation values has a least magnitude and determining which of the plurality of directional correlation values has a second least magnitude;
  determining whether the second least magnitude is greater than a product of the least magnitude and a predetermined value; and
  in response to determining that the second least magnitude is greater than the product of the least magnitude and the predetermined value, identifying that the second set of pixels is on the dominant edge;
with the image processing circuitry, generating interpolated pixel values for the second set of image pixels; and
with the image processing circuitry, applying a chroma filter to the interpolated pixel values.

2. The method defined in claim 1, wherein applying the chroma filter to the interpolated pixel values comprises:
  in response to determining that the second set of image pixels is within the texture area, applying the chroma filter to the interpolated pixel values in a vertical direction.

3. The method defined in claim 1, wherein generating the interpolated pixel values for the second set of image pixels comprises:
  in response to determining that the second set of image pixels is within the texture area, performing vertical interpolation operations for the second set of image pixels to generate the interpolated pixel values.

4. The method defined in claim 3, wherein the first set of image pixels is interleaved with the second set of image pixels, and wherein performing the vertical interpolation operations for the second set of image pixels comprises:
  computing a linear combination of the captured pixel values from image pixels in the first set of image pixels that are located above and below the second set of image pixels to generate the interpolated pixel values.

5. The method defined in claim 1, wherein determining whether the second set of image pixels is on the dominant edge comprises:
  computing the plurality of directional pixel correlation values for the second set of image pixels in response to determining that the second set of image pixels is outside of the texture area.

6. The method defined in claim 5, wherein computing the plurality of directional pixel correlation values for the second set of image pixels comprises:
  computing a vertical pixel correlation value, a 45 degree pixel correlation value, and a 135 degree pixel correlation value for the second set of image pixels.

7. The method defined in claim 1, wherein generating the interpolated pixel values for the second set of image pixels comprises:
  in response to determining that the second set of image pixels is on the dominant edge, performing interpolation operations for the second set of image pixels along a single direction to generate the interpolated pixel values.

8. The method defined in claim 1, wherein generating the interpolated pixel values for the second set of image pixels comprises:
  in response to determining that the second set of image pixels is not on the dominant edge, performing interpolation operations for the second set of image pixels along multiple directions to generate the interpolated pixel values.

9. The method defined in claim 1, wherein the color image data comprises red image data, green image data, and blue image data and wherein generating the interpolated pixel values for the second set of image pixels comprises:
  generating interpolated red pixel values, interpolated green pixel values, and interpolated blue pixel vales for the second set of image pixels.

10. The method defined in claim 1, wherein the color image data comprises red image data, white image data, and blue image data and wherein generating the interpolated pixel values for the second set of image pixels comprises:
  generating interpolated red pixel values, interpolated white pixel values, and interpolated blue pixel values for the second set of image pixels.

11. A method of using an image sensor and processing circuitry in an electronic device to generate a high-dynamic-range image, the method comprising:
  with the image sensor, capturing an interleaved image having rows of long-exposure pixel values that are interleaved with rows of short-exposure pixel values;
  with the processing circuitry, separating the interleaved image into a first image and a second image, wherein the first image includes the rows of long-exposure pixel values and a first set of empty pixel values, wherein the second image includes the rows of short-exposure pixel values and a second set of empty pixels values;
  with the processing circuitry, determining whether the first set of empty pixel values is within a texture area of the first image and whether the second set of empty pixel values is within a texture area of the second image;
  with the processing circuitry, generating an interpolated long-exposure image by computing interpolated long-exposure pixel values for the first image;
  with the processing circuitry, generating an interpolated short-exposure image by computing interpolated short-exposure pixel values for the second image; and
  with the processing circuitry, combining the interpolated long-exposure image and the interpolated short-exposure image to generate the high-dynamic-range image;
  with the processing circuitry, applying a directional chroma filter to at least one of the interpolated short-exposure and interpolated long-exposure pixel values in a direction that is selected based on an interpolation direction of the at least one of the interpolated short-exposure and interpolated long-exposure pixel values.

12. The method defined in claim 11, further comprising:
  with the processing circuitry, determining whether a portion of the first set of empty pixel values is on a dominant edge of the first image and whether a portion of the second set of empty pixel values is on a dominant edge of the second image.

13. The method defined in claim 12, wherein determining whether the portion of the first set of empty pixel values is on the dominant edge of the first image comprises:
  determining whether the portion of the first set of empty pixel values is on the dominant edge of the first image in response to determining that the portion of the first set of empty pixel values is outside of the texture area of the first image.

14. The method defined in claim 13, wherein determining whether the portion of the second set of empty pixel values is on the dominant edge of the second image comprises:
  determining whether the portion of the second set of empty pixel values is on the dominant edge of the second image in response to determining that the portion of the second set of empty pixel values is outside of the texture area of the second image.

15. The method defined in claim 11, wherein generating the interpolated long-exposure image by computing the interpolated long-exposure pixel values for the first image comprises:
in response to determining that the first set of empty pixel values is within the texture area of the first image, performing vertical interpolation operations for the first set of empty pixel values to compute the interpolated long-exposure pixel values.

16. A system, comprising:
a central processing unit;
memory;
input-output circuitry; and
an imaging device, wherein the imaging device comprises:
a pixel array;
a lens that focuses an image on the pixel array; and
image processing circuitry configured to interpolate color image data for an image that includes a first set of image pixels having captured pixel values and a second set of image pixels having empty pixel values, wherein the image processing circuitry is further configured to determine whether the second set of image pixels is in a texture area of the image, determine whether the second set of image pixels is on a dominant edge of the image, generate interpolated pixel values for the second set of image pixels, and perform chroma filter operations on the interpolated pixel values, wherein the image processing circuitry performs multi-directional interpolation operations for the empty pixel values in response to determining that the second set of image pixels is not on the dominant edge.

17. The system defined in claim 16, wherein the pixel array is configured to capture rows of long-exposure pixel values that are interleaved with rows of short-exposure pixel values.

18. The system defined in claim 17, wherein the image processing circuitry is further configured to generate a high-dynamic-range image using the interpolated pixel values and the captured pixel values.

* * * * *